United States Patent [19]
Larson

[11] Patent Number: 5,155,358
[45] Date of Patent: Oct. 13, 1992

[54] DOUBLE WALL CAMERA HOUSING WITH THERMOSTATIC COOLER

[75] Inventor: Wayne Larson, Lancaster, Ohio

[73] Assignee: The Babcock & Wilcox Company, New Orleans, La.

[21] Appl. No.: 729,252

[22] Filed: Jul. 12, 1991

[51] Int. Cl.$^5$ .............................................. H01J 40/14
[52] U.S. Cl. .................................. 250/238; 358/213.16
[58] Field of Search ............................. 250/238, 352; 358/213.16, 100, 113; 312/236; 62/5, DIG. 10; 165/169

[56] References Cited

U.S. PATENT DOCUMENTS

| | | | |
|---|---|---|---|
| 3,609,236 | 9/1971 | Heilman | 359/820 |
| 3,786,269 | 1/1974 | Cooper | 358/113 |
| 4,290,083 | 9/1981 | Collender | 358/88 |
| 4,301,998 | 11/1981 | Rodway | 266/281 |
| 4,695,881 | 9/1987 | Kennedy et al. | 358/100 |
| 4,767,924 | 8/1988 | Giebel et al. | 250/233 R |
| 4,933,543 | 6/1990 | Hull | 250/214 C |

*Primary Examiner*—Constantine Hannaher
*Assistant Examiner*—James E. Beyer
*Attorney, Agent, or Firm*—Vytas R. Matas; Robert J. Edwards; Daniel S. Kalka

[57] ABSTRACT

A double wall housing for a camera contains a thermostatic switch which senses elevated temperature within the housing to activate a compressed air powered vortex tube which is capable of producing cool air. The cool air is supplied to a helical path between inner and outer housing members of the housing to cool the housing and its interior space. A second thermoswitch mounted outside the housing senses the ambient temperature and, if the temperature rises to a selected level, activates a compressed air supply for supplying purging air to the lens tube.

14 Claims, 4 Drawing Sheets

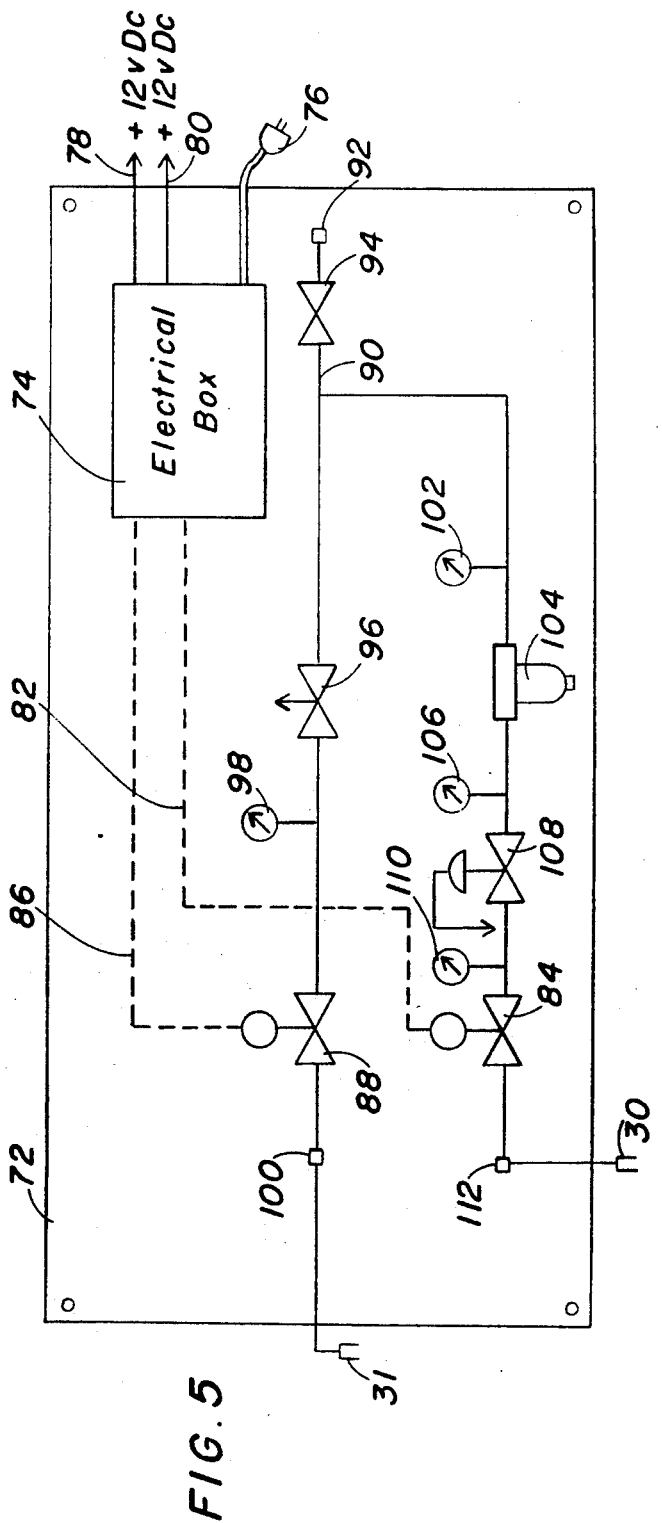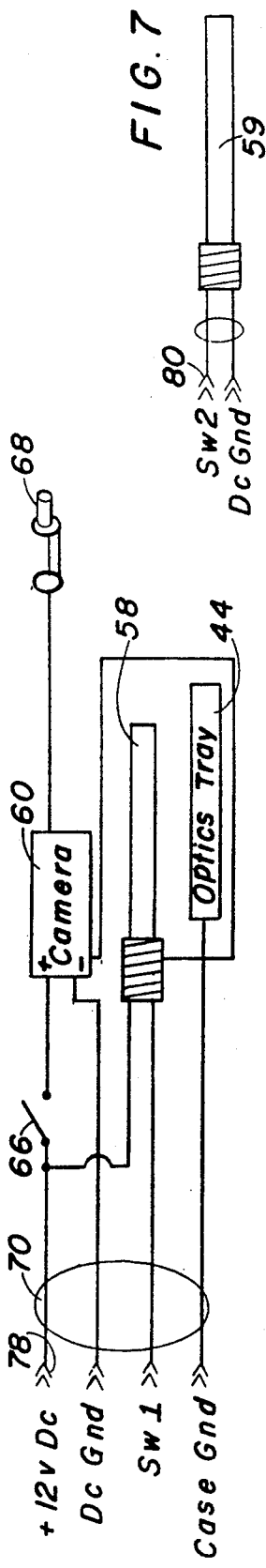

DOUBLE WALL CAMERA HOUSING WITH THERMOSTATIC COOLER

FIELD AND BACKGROUND OF THE INVENTION

The present invention relates in general to specialized housing constructions, and in particular to a new and useful housing for a camera and associated optical and electrical equipment, which protects the camera and related equipment from temperature extremes.

U.S. Pat. No. 4,933,543 relates to dark signal compensation for diode arrays. This reference teaches the minimizing of thermal noise by maintaining the internal temperature of a camera and the temperature of a diode array as close to ten degrees centigrade as possible. This is achieved with a refrigeration unit including a heat exchanger which cools the diode array as necessary, depending on variations in the internal temperature surrounding the photodiode array. A thermistor drives the temperature compensation circuit for varying the temperature reading upwardly or downwardly depending upon the minimal temperature drift detected by the thermistor.

U.S. Pat. No. 4,301,998 is directed to a vertical gunning apparatus with a television monitor. This reference teaches employing an air conduit for supplying pressurized air to cool and clean a transparent heatresistant port in a line on the side of the lens of the camera. It further employs cooling water conduits concentric with and jacketing the electrical conduit and a substantial portion of the air conduit.

U.S. Pat. No. 4,767,924 discloses a double wall light source having an exterior housing which surrounds a sealed inner housing. A socket allows for the connection of an optical fiber cable. The air in the intermediate space between the inner housing and the exterior housing is continuously replaced by ambient air using a fan to dissipate heat generated therein.

U.S. Pat. No. 4,695,881 relates to an apparatus for imaging infrared emitting surfaces such as those found in the smelt bed of a Kraft recovery boiler. An enclosure covering a camera head/yolk assembly and cooling air is provided in a channel which passes through an air line to the inside of the housing. The housing surrounds the camera head and yolk assembly, and channels the air to the camera lens.

None of the forgoing references disclose or suggest a double wall camera housing with a thermostatic cooling features or circuit arrangement of the present invention.

SUMMARY OF THE INVENTION

The present invention comprises a double wall camera housing with thermostatic cooling. The optics/camera tray slides inside the interior of the housing and contains a thermoswitch. The interior housing surrounds the optics/camera tray and protects it from moisture and foreign particulate matter. The interior housing has surrounding baffles which direct a cooling air flow around its walls to cool the optics/camera tray contained within. An exterior housing covers the interior housing to seal the unit. A vortex tube connected to an air source provides cool air into the exterior housing. The exterior housing has a cool air outlet hole to provide for a flow stream.

The present invention provides for separate cooling of the lens tube and of the optics/camera tray housing. Advantageously, the subject invention employs 12 volt DC camera output and thermal switches to relay switches for the air supplies, rather than 120 volts AC.

The electrical circuitry and valve arrangement is designed to provide cooling air to the camera enclosure and lens tube on either a loss of electrical power or a power supply or solenoid coil component failure.

Accordingly, an object of the present invention is to provide a double wall camera housing which can stabilize the temperature environment of sensitive optical and camera equipment in the housing, despite the proximity of the housing to or in a hostile environment, such as a boiler.

A further object of the present invention is to provide a double wall camera housing which conveniently receives a tray which can be quickly dismantled from the housing for maintenance or replacement.

Another object of the present invention is to provide a double wall camera housing with thermostatic cooler which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

BRIEF DESCRIPTION OF THE DRAWINGS

In the drawings:

FIG. 5 is a schematic diagram of a pneumatic and electrical supply panel for servicing the optics/camera tray;

FIG. 6 is a schematic diagram of the optics/camera tray;

FIG. 7 is a schematic side view of a second boiler wall mounted thermoswitch for use in conjunction with the present invention;

DESCRIPTION OF THE PREFERRED EMBODIMENTS

Figure 1:
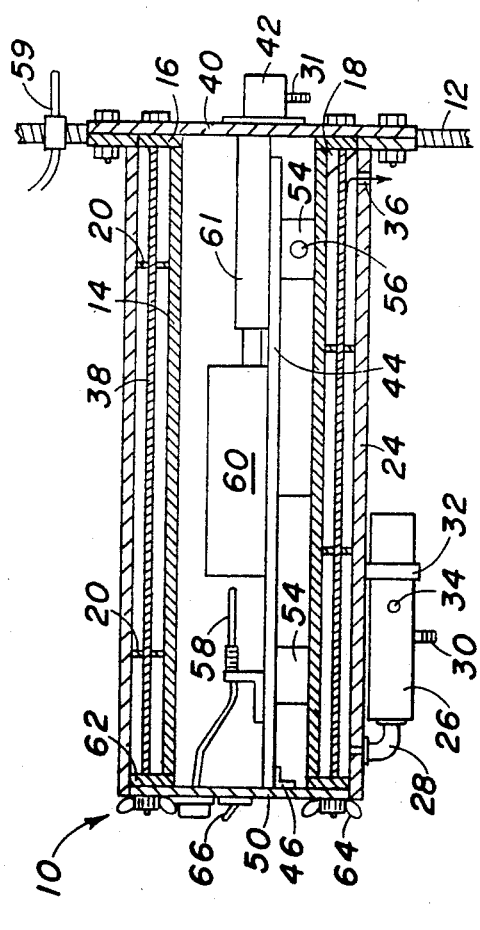
FIG. 1 is a side sectional view of the double wall camera housing with thermostatic cooler according to the present invention.

Referring to the drawings in particular, the invention embodied in FIG. 1 comprises a double wall camera housing with thermostatic cooler generally designated 10 which is adapted for use in hostile environments, for example, mounted to a schematically illustrated boiler wall 12.

The housing includes an inner housing member 14 made of fiberglass, steel, aluminum, stainless steel or other strong material, and having a rectangular, in particular, square cross section. Other cross sectional shapes may also be used. Advantageously, inner housing member 14 has a length of from 12 to 24 inches depending on the length of an optics/camera tray to be used in the housing, and a cross section of 4×4 inches. A square front bulkhead 16 is fixed to the front end of housing member 14 and is secured by a plurality of gusset plates 18. A commercially available example of inner housing member 14 is the model F-44WXFG Fiberglass NEMA 12 Feed Through Wireway, available from the Hoffman Engineering Company of Anoka, MN.

Figure 2:
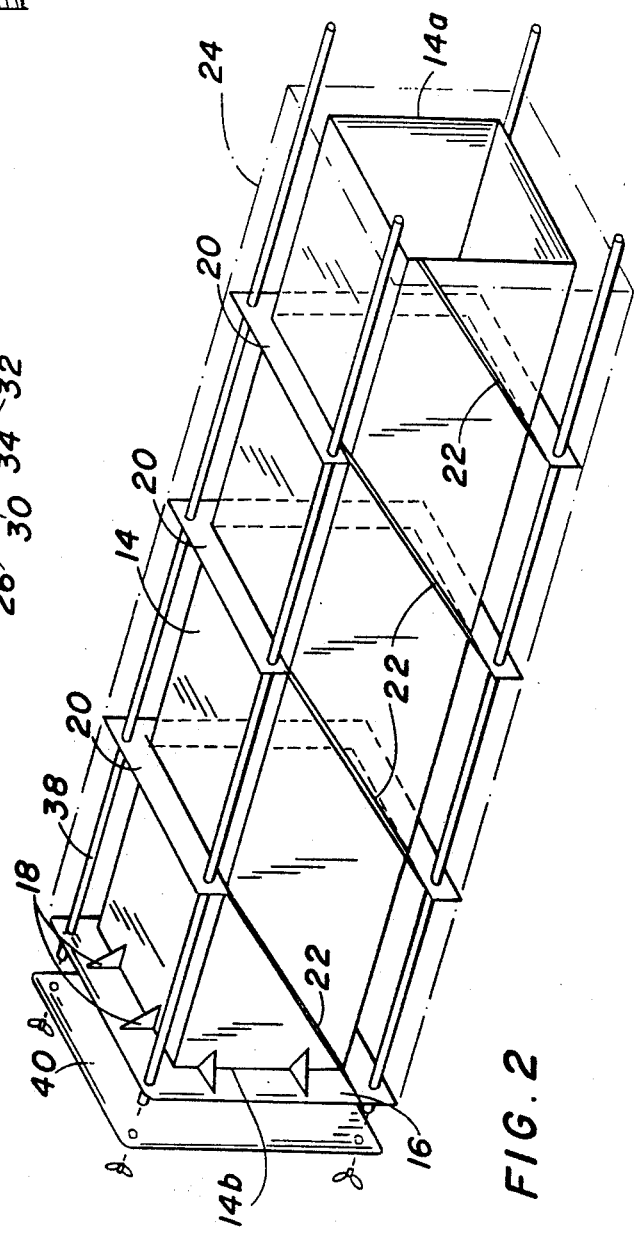
FIG. 2 is a rear, bottom perspective view of the inner housing structure having an outer baffle arrangement.

As best shown in FIG. 2, a plurality of C-shaped baffle plates 20 are fixed, for example by cementing or welding, to the opposite sides and top of the housing member 14 at spaced location along the length of the housing member. One end of the baffle plate 20 nearest bulk head 16 is connected to the bulk head 16 by an inclined baffle plate 22. The opposite end of this baffle plate 20 is connected by a second inclined baffle plate 22 to one end of the second baffle plate 20. This continues, one C-shaped baffle plate to the next, until a substantially helical path is defined around the inner housing member 14 from its rear end 14a to its front end 14b.

Figure 3:
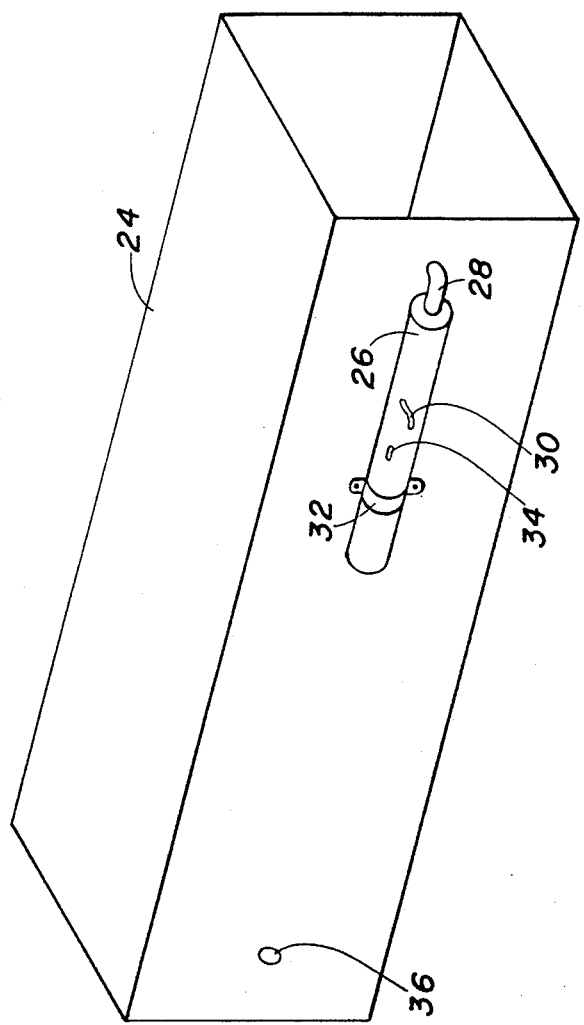
FIG. 3 is a rear bottom perspective view of an outer housing structure for engagement over the inner housing structure of FIG. 2.

An elongated outer housing member 24 having a square cross section is slid over the inner housing member 14 in its baffle arrangement. Outer housing member 24 shown in FIG. 3, in an assembled condition for the double wall housing, would be in the phantom line position 24 shown in FIG. 2. This effectively closes the outer boundary of the helical path defined by baffle arrangement 20, 22. Cool air supply means 26 which is capable of supplying cool air to an elbow 28 when means 26 is supplied with compressed air at an inlet 30, is attached by a saddle strap 32 to the bottom surface of outer housing member 24. Hot exhaust air leaves cool air supply means 26 at a hot air outlet 34. Cool air supply means 26 is of the commercially available vortex tube type available under the trademark 780/790 VORTEX COOLERS.

Figure 4:
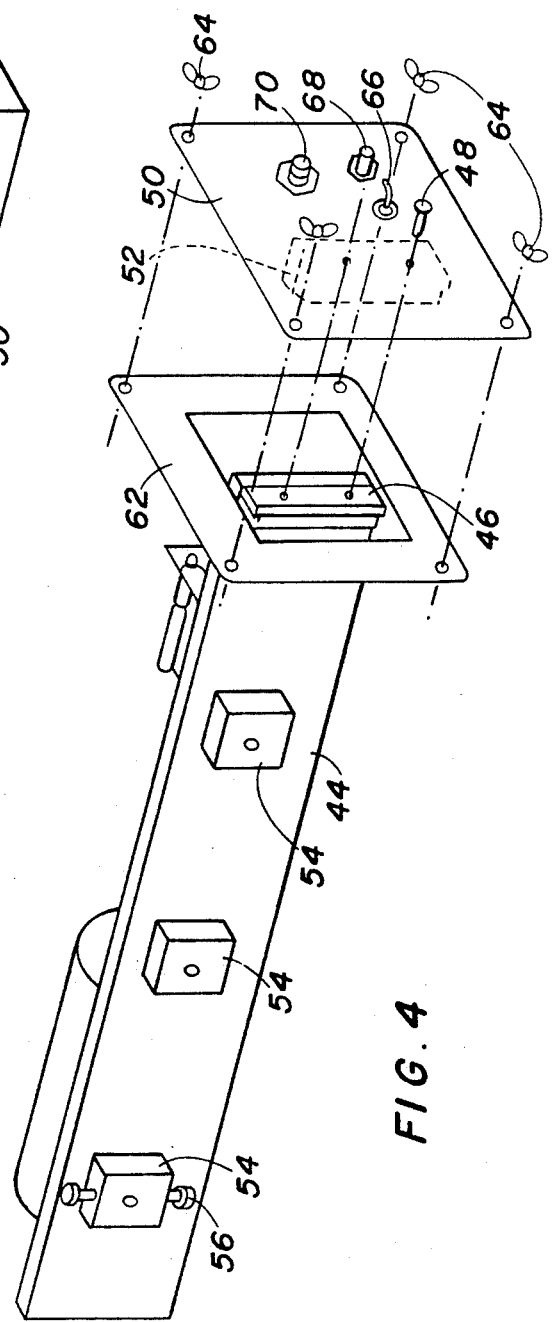
FIG. 4 is an exploded rear bottom perspective view of the optics/camera tray and rear control panel of the invention.

Cool air supply means 26 thus supplies cool air to the rear end of the helical path. The cool air is discharged at a cool air outlet hole 36 in the outer housing member 24 near the front end of the helical path. Four tie rods 38 extend through four holes in each of the C-shaped baffle plates and in four holes extending through the bulkhead 16. Four matching holes are provided in a front lens or lens tube mounting plate 40 which is adapted for carrying a lens or lens tube 42 design to withstand the hostile environment in a boiler. As best shown in FIG. 1 and 4, an optics/camera tray 44 is mounted in the inner housing member 14. A rear angle bracket 46 which is fixed at the rear edge of tray 44, is connected by screws 48 to a control panel 50 which carries a second angle bracket 52 for better securing the tray 44. A plurality of resting blocks 54 are connected to the bottom surface of tray 44. At least the front most block 54 has a pair of oppositely extending guide screws 56 which can be adjusted to guide the tray laterally as it is slid into the inner housing member 14. A first thermoswitch 58 is mounted to the upper surface of tray 44 along with a CCD video camera 60 which is mounted so that it can receive light through optics 61 and the lens tube 42.

A rear bulkhead 62 also has four holes at the four corners thereof, as does panel 50, so that both front and rear bulkheads 16 and 62, all C-shaped baffle plates 20, mounting plate 40 and control panel 50 can be connected together by the tie rods 38 and four wing nuts 64.

Control panel 50 also carries a camera on/off switch 66, a video output connection 68 and a connection 70 for power and the thermoswitch.

Figure 8:
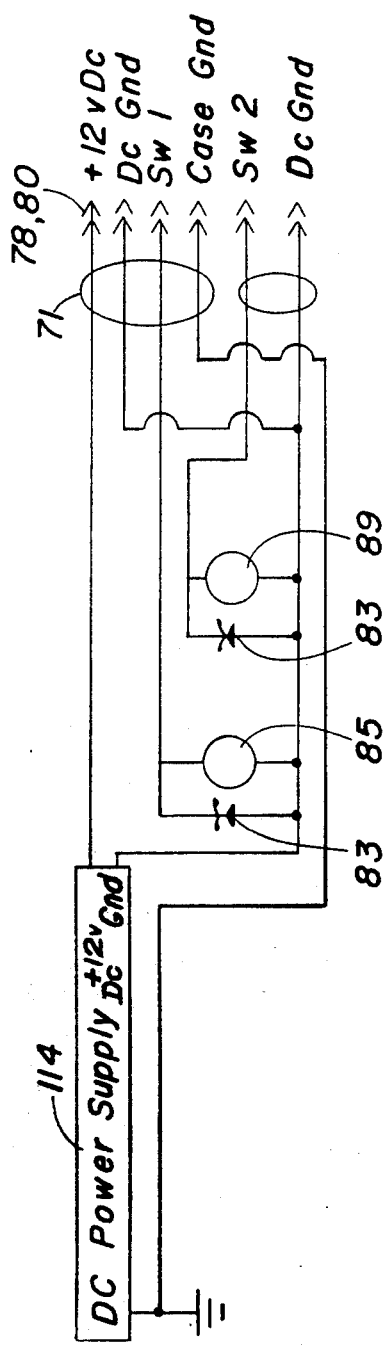
FIG. 8 is a schematic diagram of a DC power supply for the electrical panel of FIG. 5.
Figure 9:
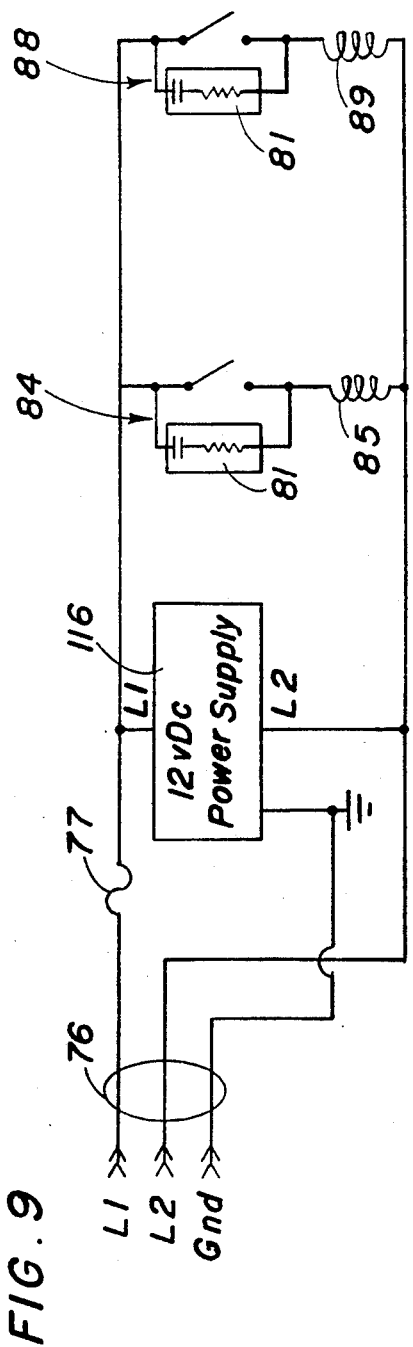
FIG. 9 is a view similar to FIG. 8 of an AC power supply.

Turning now to FIGS. 5, 6 and 7, the apparatus of FIG. 1 is used in conjunction with a pneumatic and electrical supply mounting panel 72 which carries an electrical box 74 shown in greater detail in FIGS. 8 and 9.

Box 74 receives 120 VAC from a power cord and plug 76 and outputs 12 volts DC at a supply 78 to powering camera 60 over switch 66, and 12 volts DC at supply 80 which is used to power a second thermoswitch 59 which is mounted to the boiler wall 12. Supply 78 also powers first thermoswitch 58. Both thermoswitches 58 and 59 are grounded as is the camera 60 and the tray 44. The thermoswitches open on temperature rise and employ 4° C. hysteresis.

Electrical box 74 also supplies 120 volts AC along a line 82 to a first solenoid valve 84 and 120 volts AC along a line 86 to a second solenoid valve 88. Solenoid valves 84 and 88 are each connected to a compressed air supply line 90 for receiving compressed air from an air supply connection 92 and a shutoff valve 94. The solenoid valves open when de-energized. A needle valve 96 and a pressure gauge 98 is also provided in the compressed air line to second solenoid valve 88 which, along an air hose connection 100 supplies air to a purge air connection 31 in lens tube 42. A gauge 102, air filter with automatic drain 104 and second gauge 106 are connected ahead of a pressure regulator 108 and further pressure gauge 110, in the line supplying compressed air to the first solenoid valve 84. The first solenoid valve 84 supplies an air hose connection 112 which is connected by a hose to compressed air connection 30 of vortex tube 26.

As will be explained in connection with FIGS. 8 and 9, respective thermoswitches 58 and 59 control the supply of air to the camera housing and lens tube, through first and second solenoid valve 84 and 88. Turning now to FIG. 8, a 12 volt DC power supply 114 supplies 12 volts to the first and second thermoswitches through a plug 71 to be connected to connector 70 on control panel 50. 85 and 89 designate respective coils for the first and second solenoid valve 84 and 88. Each coil is serviced by a kickback diode 83.

FIG. 9 illustrates the 120 volts AC power supply 116 which receives line current along L1 and L2 through plug 76. This powers the first and second 120 volts AC solenoid which each have a surge suppressor 81, formed by a capacitor and a resistor in series, connected thereacross. The circuit is protected by a fuse 77.

In operation, if the temperature adjacent lens tube 42 rises above a selected temperature in the boiler, the second thermoswitch 59 opens which, through the DC circuit of FIG. 8, causes the opening of second valve 88 and a supply of purging air over connection 31.

In likewise fashion, if the temperature within the double wall housing 10 rises above a set point, this is sensed by the first thermoswitch 58 which causes the first valve 84 to open, supplying air to inlet 30 which causes cool air supply means 26 to supply cool air to the helical path between the housing members.

While a specific embodiment of the invention has been shown and described in detail to illustrate the application of the principles of the invention, it will be understood that the invention may be embodied otherwise without departing from such principles.

What is claimed is:

1. A double wall camera housing with thermostatic cooler comprising:
   an inner housing member defining an interior space and having front and rear ends which are spaced from each other;
   an outer housing member engaged over said inner housing member and defining a cooling space therewith;
   a plurality of spaced apart C-shaped baffle plates engaged over said inner housing member and extending within said outer housing member;
   a plurality of inclined baffle plates interconnecting opposite ends of adjacent C-shaped baffle plates for forming a helical path defining a cooling air path in said cooling space;
   cool air supply means for supplying cool air, connected to said cooling air path for supplying cool air along said path in said cooling space;
   a tray mounted in said interior space for carrying optical and camera equipment in said interior space; and
   a thermoswitch mounted to said tray in said interior space for sensing a temperature in said interior space, said thermoswitch being operatively connected to said cool air supply means for activating said cool air supply means to supply cool air to the cooling air path when the temperature in said interior space rises above a selected value.

2. A double wall camera housing with thermostatic cooler according to claim 1, wherein said inner and outer housing members are rectangular in cross section.

3. A double wall camera housing with thermostatic cooler according to claim 1, wherein said cool air supply means comprises a vortex tube having an inlet for compressed air, an outlet for cool air connected to one end of said cooling air path, and an outlet for hot air, said vortex tube being connected to an outer surface of said outer housing member, and compressed air supply means connected between said thermoswitch and said vortex tube inlet, for activation by said thermoswitch to supply compressed air to said vortex tube inlet.

4. A double wall camera housing with thermostatic cooler according to claim 3, wherein said compressed air supply means includes a solenoid valve having high voltage capacity and a low voltage control coil, said thermoswitch being connected to activate said low voltage coil for opening said solenoid valve.

5. A double wall camera housing with thermostatic cooler according to claim 1, including a front bulkhead connected to the front end of said inner housing member and a rear bulkhead connected to a rear end of said inner housing member, a control panel fixed to a rear end of said tray and a lens tube panel, said lens tube panel, front and rear bulkheads and control panel being connected to each other.

6. A double wall camera housing with thermostatic cooler according to claim 5, including at least one resting block connected to a lower surface of said tray and resting on an inner surface of said inner housing member.

7. A double wall camera housing with thermostatic cooler according to claim 6, including at least one guide screw engaged with said resting block for engaging an inner side surface of said inner housing member for guiding said tray in said inner housing member.

8. A double wall camera housing with thermostatic cooler according to claim 1, including a mounting plate connected to the front end of said inner housing member, lens means connected to said mounting plate having an inlet for purging air, a second thermoswitch mounted adjacent said mounting plate and compressed air supply means connected to said second thermoswitch for activation of said compressed air supply means for supplying compressed air to the inlet of said lens means when a temperature sensed by said second thermoswitch rises above a selected value.

9. A double wall camera housing with thermostatic cooler according to claim 8, wherein said first mentioned and second thermoswitches are connected to said compressed air supply means, said compressed air supply means including first and second valves connected respectively to said first mentioned and second thermoswitches for selectively supplying compressed air to said lens means and said cooling air supply means.

10. A double wall camera housing with thermostatic cooler according to claim 9, wherein said first and second valves have low voltage coils and carry high voltage when closed, said first mentioned and second thermoswitches being low voltage thermoswitches.

11. A double wall camera housing with thermostatic cooler according to claim 9, wherein said cool air supply means comprises a vortex tube having an inlet for compressed air, an outlet for cool air connected to one end of said cooling air path, and an outlet for hot air, said vortex tube being connected to an outer surface of said outer housing member, said compressed air supply means being connected between said thermoswitch and said vortex tube inlet, for activation by said thermoswitch to supply compressed air to said vortex tube inlet.

12. A double wall camera housing with thermostatic cooler according to claim 9, including a front bulkhead connected to the front end of said inner housing member and a rear bulkhead connected to a rear end of said inner housing member, a control panel fixed to a rear end of said tray and a lens tube panel, said lens tube panel, front and rear bulkheads and control panel being connected to each other.

13. A double wall camera housing with thermostatic cooler according to claim 12, including at least one resting block connected to a lower surface of said tray and resting on an inner surface of said inner housing member.

14. A double wall camera housing with thermostatic cooler according to claim 13, including at least one guide screw engaged with said resting block for engaging an inner side surface of said inner housing member for guiding said tray in said inner housing member.

* * * * *